(12) United States Patent
Barkdoll

(10) Patent No.: US 6,503,241 B1
(45) Date of Patent: Jan. 7, 2003

(54) POOL HEATING APPARATUS

(76) Inventor: Gerald L. Barkdoll, 12314 Riding Fields Rd., Rockville, MD (US) 20850

( * ) Notice: Subject to any disclaimer, the term of this patent is extended or adjusted under 35 U.S.C. 154(b) by 0 days.

(21) Appl. No.: 10/047,319

(22) Filed: Jan. 14, 2002

(51) Int. Cl.⁷ .................................................. E04H 4/00
(52) U.S. Cl. ........................... 604/496; 4/493; 126/565; 126/566
(58) Field of Search ............................. 4/493, 492, 496, 4/498; 239/DIG. 7; 126/565, 566

(56) References Cited

U.S. PATENT DOCUMENTS

| | | | |
|---|---|---|---|
| 3,072,920 A | * | 1/1963 | Yellott ............................ 4/498 |
| 3,411,163 A | * | 11/1968 | Myers, Jr. ....................... 4/493 |
| 3,598,104 A | * | 8/1971 | Trostler ......................... 4/493 |
| 3,927,427 A | | 12/1975 | Aine |
| 3,949,095 A | | 4/1976 | Pelehach et al. |
| 4,082,081 A | | 4/1978 | McColgan et al. |
| 4,085,732 A | * | 4/1978 | Hysom |
| 4,103,368 A | | 8/1978 | Lockshaw |
| 4,146,015 A | | 3/1979 | Acker |
| 4,197,595 A | | 4/1980 | Dearing |
| 4,222,366 A | | 9/1980 | Acker |
| 4,256,087 A | | 3/1981 | Sowers |
| 4,284,060 A | | 8/1981 | McCluskey |
| 4,366,806 A | | 1/1983 | Acker |
| 4,601,072 A | | 7/1986 | Aine |
| 4,660,545 A | * | 4/1987 | Ely |
| 4,698,109 A | * | 10/1987 | Lazar ............................ 4/498 |
| 5,347,984 A | | 9/1994 | Klaren |
| 5,511,536 A | | 4/1996 | Bussey, Jr. et al. |
| 5,516,386 A | | 5/1996 | Savarese |
| 5,586,548 A | | 12/1996 | Hsia |
| 5,860,413 A | | 1/1999 | Bussey, Jr. et al. |

FOREIGN PATENT DOCUMENTS

DE         2 633 581 A1 *  2/1978  ................. 4/493

* cited by examiner

*Primary Examiner*—Charles R. Eloshway
(74) *Attorney, Agent, or Firm*—Luedeka, Neely & Graham PC

(57) ABSTRACT

A method and apparatus for heating an outdoor swimming pool. The apparatus includes a substantially buoyant web having a first end, a second end, a first exterior surface and a second exterior surface. A water distributor is attached to the first end of the web for flowing pool water longitudinally adjacent the first exterior surface of the web. A conduit in flow communication with the distributor provides a flow of water from a swimming pool pump to the water distributor. The water distributor is disposed to distribute the flow of water adjacent the first exterior surface of the web. The invention provides a pool heating device that is effective to heat pool water without using water flow conduits along the length of the web and is simply constructed for low cost, portability and case of manufacturing.

20 Claims, 10 Drawing Sheets

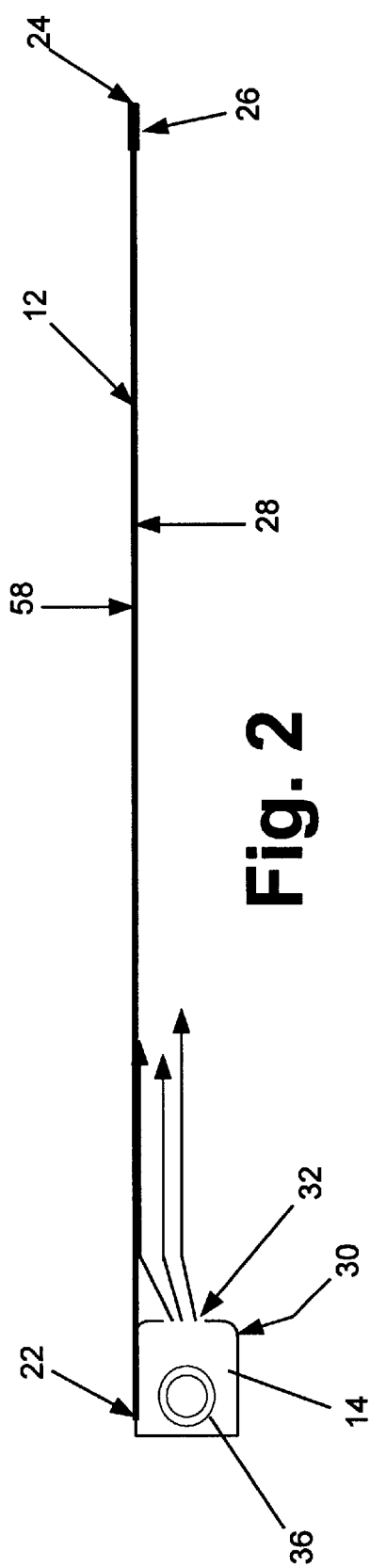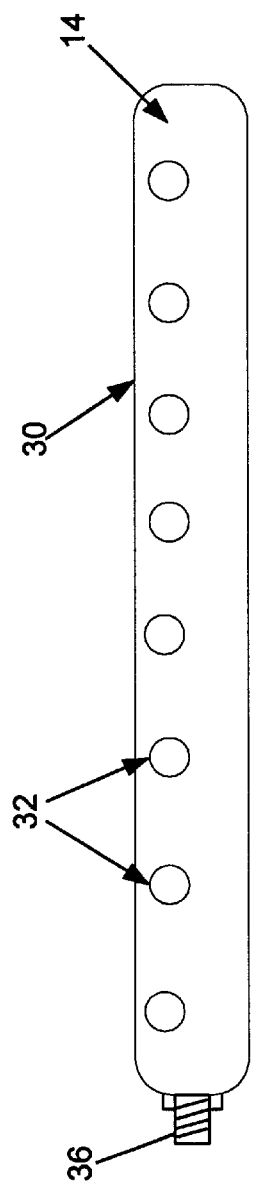

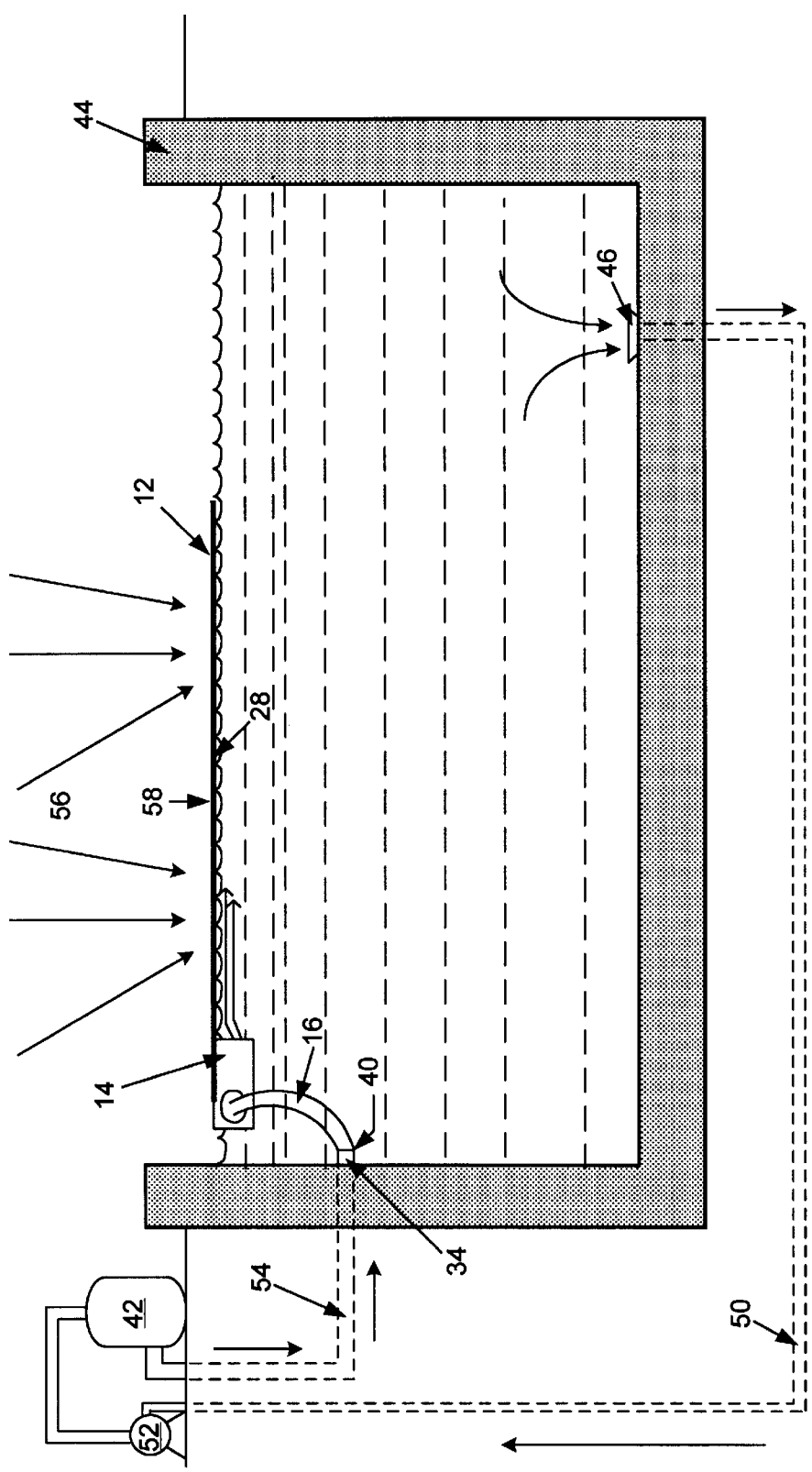

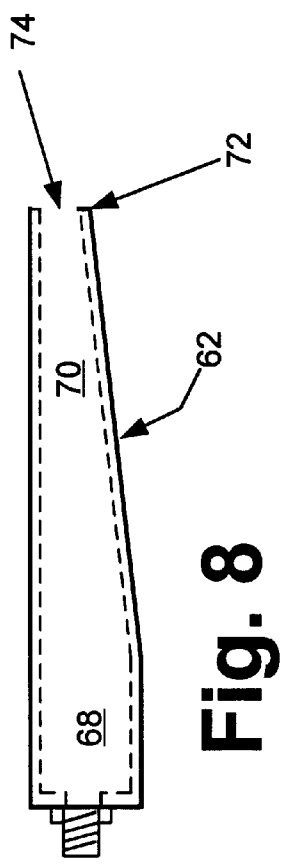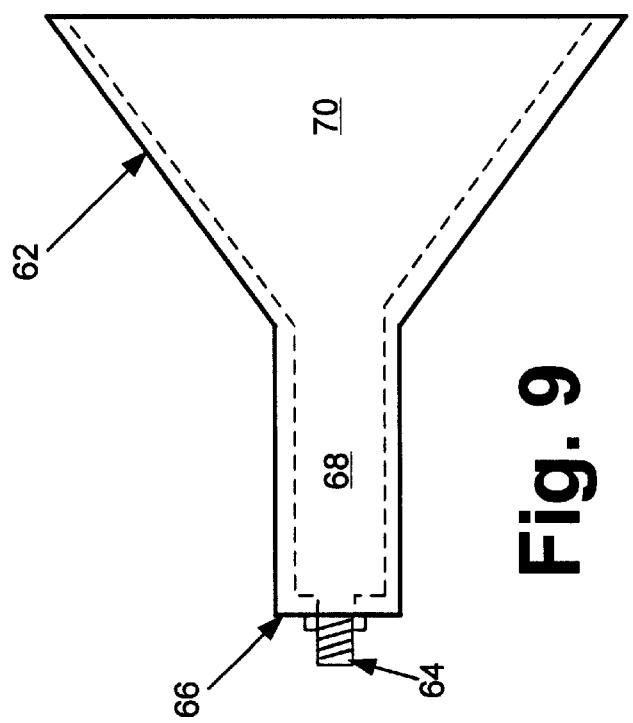

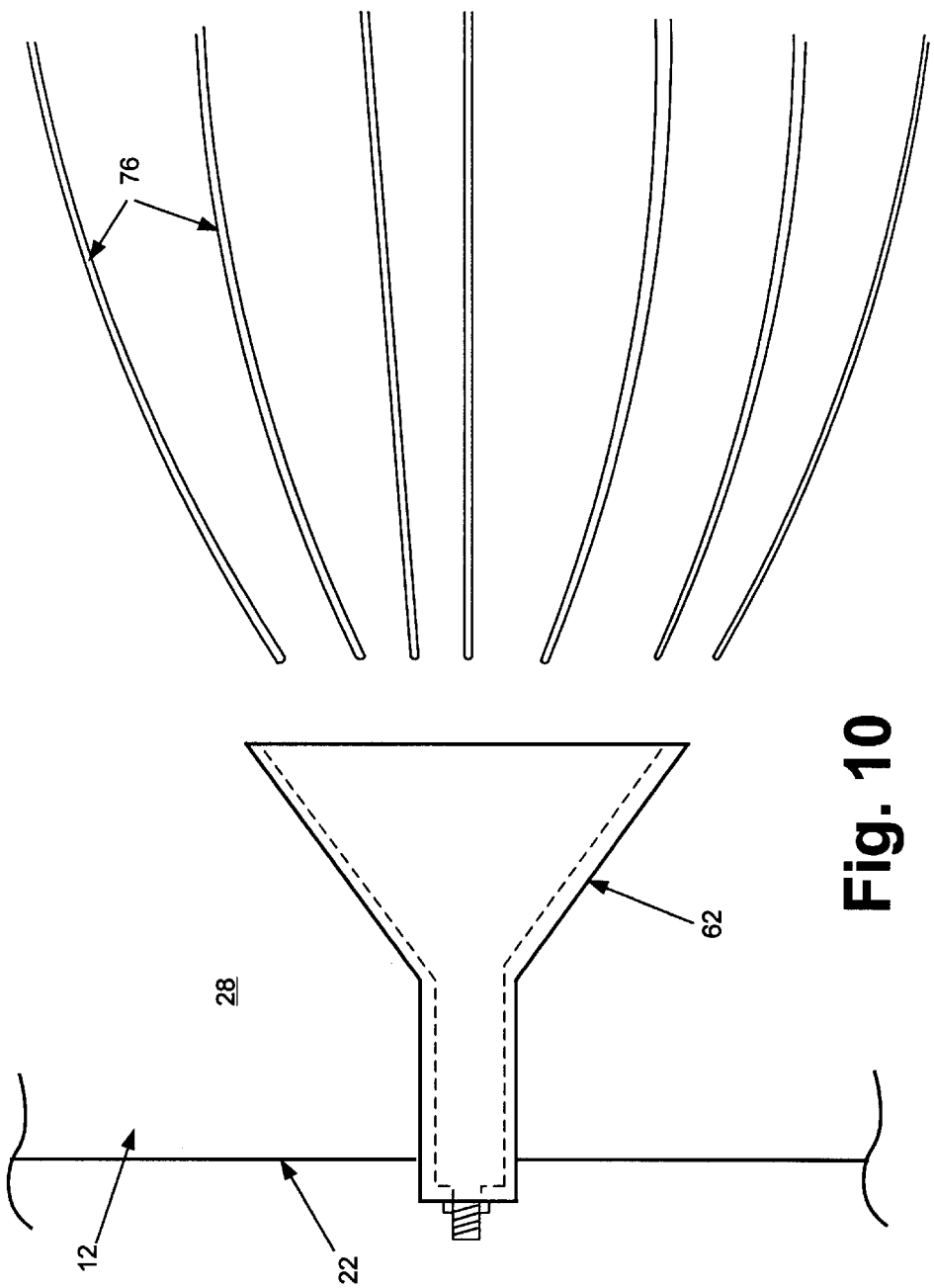

POOL HEATING APPARATUS

FIELD OF THE INVENTION

The invention relates to a pool heating device and more particularly to an floating apparatus adaptable for heating pools which is lightweight and easily storable.

BACKGROUND

Swimming pools are heated for two reasons, (1) to extend the swimming season to earlier in the spring and later in the fall and (2) to provide more comfortable water temperatures throughout the swimming season. Pool heating is typically conducted with several types of heating systems. One type of heating system circulates pool water through an electric or gas-fired water heating system. A second type of heating system uses solar panels through which the pool water is circulated. A third type of heating system uses floating panels through which water is circulated, the panels being heated by the sun. Another type of pool cover for heating pools consists of a floating structure containing channels for flow of water therethrough. The floating structure is heated by the sun which in turn heats the water flowing through the channels.

Despite the variety of pool heating devices available, there continues to be a need for a simple economical pool heating device which is easily adaptable to various size pools and which does not rely on a channeled web for maintaining water contact with the heating surface of the web. There is also a need for a pool heating device that does not consume precious natural resources or that adds pollutants to the environment. Such a device should be relatively inexpensive to own and operate yet be effective to sufficiently heat swimming pool water.

SUMMARY OF THE INVENTION

With regard to the above and other needs and advantages, the invention provides an outdoor swimming pool heating apparatus. The apparatus includes a substantially buoyant web having a first end, a second end, a first exterior surface and a second exterior surface, the second exterior surface being positionable to face away from a water surface of the swimming pool and the first exterior surface being positionable adjacent and facing the water surface. A water distributor is attached to the first end of the web adjacent the first exterior surface of the web for flowing pool water longitudinally adjacent the first exterior surface of the web. A conduit in flow communication with the distributor provides a flow of water from a swimming pool pump to the water distributor. The water distributor is disposed to distribute the flow of water adjacent the first exterior surface of the web.

In another aspect the invention provides a method for heating a swimming pool. The method includes providing a swimming pool heating apparatus including, a substantially flexible elongate web having a first end and a second end and a first surface and a second surface, a water distribution device attached to a first end of the flexible elongate web adjacent the first surface of the web for flowing pool water longitudinally adjacent the first surface of the web, and a flexible tubular conduit connected to the water distribution device for providing water from a swimming pool pump to the water distribution conduit. The web is configured to float on pool water and the web does not contain water flow conduits therein for flow of water from the water distribution device along the first or second surface of the web. The web is floated on a surface of the swimming pool water. The flexible tubular conduit is connected to a swimming pool jet for flow of water from the swimming pool pump to the water distribution device for water flow along the first surface of the web. Water is flowed along the first surface of the web while exposing the web to sunlight thereby heating the water adjacent the first surface of the web.

As set forth in more detail below, the invention provides a relatively light-weight, easily manufactured pool heating device which does not rely on flow of water through channels adjacent the pool water surface. Accordingly, the device according to the invention lends itself to simpler more cost effective manufacturing techniques as compared to the formation of channelled web. The apparatus of the invention is also more reliable with regard to operation since there are no water flow channels to fail and cause loss of water circulation adjacent the web.

BRIEF DESCRIPTION OF THE DRAWINGS:

Further advantages of the invention are apparent by reference to the detailed description when considered in conjunction with the figures, which are not to scale so as to more clearly show the details, wherein like reference numbers indicate like elements throughout the several views, and wherein:

FIG. 2 is side elevational view, not to scale, of a pool water heating apparatus according to the invention;

FIG. 3 is a side view, not to scale, of a water distribution device for a pool water heating apparatus according to a first embodiment of the invention;

FIG. 4 is a schematic representation of a swimming pool system and pool water heating apparatus according to the invention;

FIG. 8 is a side elevational view, not to scale, of a fan-jet nozzle for a pool water heating apparatus according to a second embodiment of the invention;

FIG. 9 is a plan view, not to scale, of a fan-jet nozzle for a pool water heating apparatus according to a second embodiment of the invention;

FIG. 10 is a bottom plan view of a flexible web and attached fan-jet nozzle for a pool water heating device according to a second embodiment of the invention;

DETAILED DESCRIPTION OF THE INVENTION

With initial reference to FIGS. 1–5, details of the apparatus and method of the invention will now be described. A preferred embodiment of a pool heating apparatus 10 includes three main components: an elongate flexible web 12, a water distribution device 14 and a flexible conduit 16.

The web 12 is in flow communication with the water distribution device 14. The conduit 16 is also in flow communication with the water distribution device 14 for feeding water from swimming pool circulation jets to the water distribution device 14. The circulation jets are conventional to swimming pool pump circulation systems.

Figure 1:
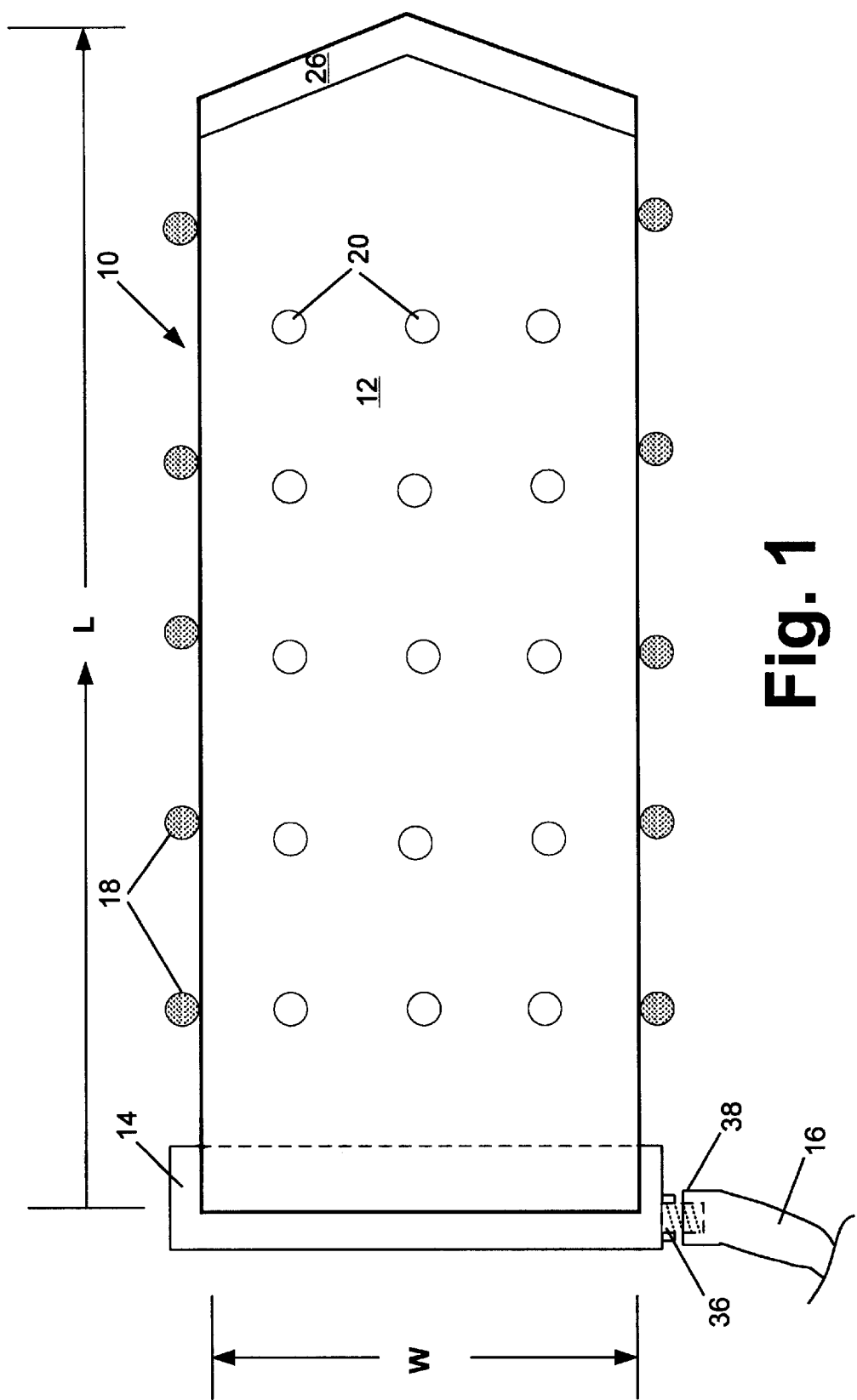
FIG. 1 is a plan top view, not to scale, of a pool water heating apparatus according to the invention.
Figure 5:
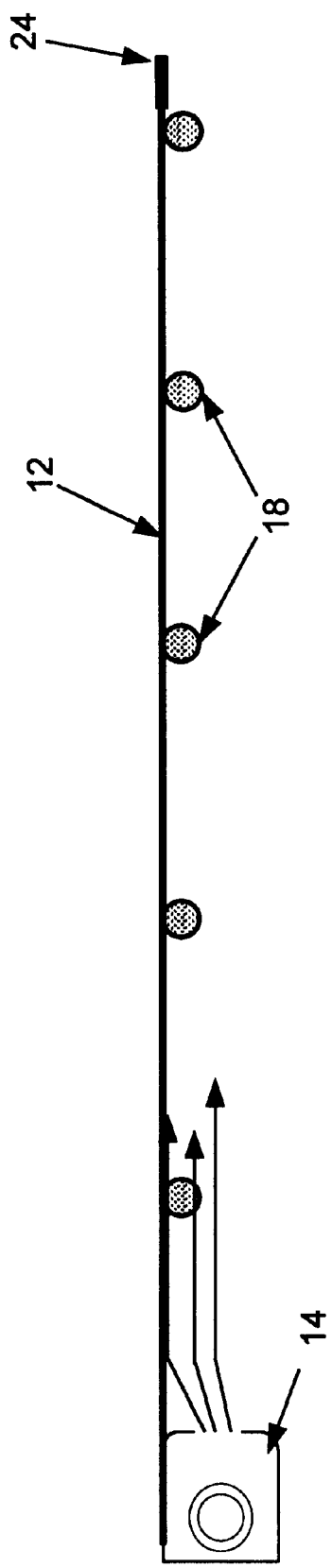
FIG. 5 is side elevational view, not to scale, of a pool water heating apparatus according to an alternative embodiment of the invention.

The web 12 is preferably made from a light weight, substantially flexible material which has acceptable resistance to ultraviolet (UV) light and pool chemicals such as chlorine, hypochlorite, ozone and the like. It is preferred that the web 12 have a specific gravity of less than about 1 and have an overall dark color such as black, brown, dark blue, dark green and the like. A particularly preferred color for the web 12 is black. The web material may be made of vinyl, expanded foam or other relatively durable light weight materials. If the web 12 has a specific gravity of more than about 1, air pockets may be provided in the web by laminating two web materials together to provide enclosed air filled spaces or pockets, or, in the alternative, floatation devices 18 may be periodically attached to the web 12 as shown in FIGS. 1 and 5.

In order to inhibit accumulation of water on the surface of the web 12 opposite the water surface of the pool, slits or holes 20 are preferably provided in the web 12. Multiple webs 12 may be attached together with, for example, hook and loop fasteners, zippers, tape and the like, to provide a wider or longer web 12 for heating pool water. It is preferred that the web 12 have a total surface area which is about 10 to about 25 percent of the total pool water surface area. A particularly preferred web 12 has a length L ranging from about 5 to about 10 feet and a width W ranging from about 40 to about 60 inches.

As shown in FIG. 2, the web 12 has a first end 22 attached to the water distribution device 14 and a second distal end 24. The second distal end 24 preferably contains a floatation enhancing device 26 such as foam which enables the second end 24 of the web 12 to remain on the surface of the water. A first surface 28 of the web 12 is attached on the first end 22 thereof to the water distribution device 14 by any known method for attaching a web 12 to a channel or header. Such methods include tape, adhesive, rivets, screws, crimped flanges and the like. The method for attaching the web 12 to the distribution device 14 is not particularly important to the invention.

The water distribution device 14 is shown in detail in FIGS. 2 and 3. The device 14 is a substantially rectangular conduit 30 containing a plurality of spaced-apart apertures 32 or other openings, holes or slits for flow of water therethrough. The apertures 32 are preferably located or disposed to induce water flow along the first surface 28 of the web 12. Water is supplied to the water distribution device 14 from the swimming pool inlet water jets 34 (FIG. 4) or other source of recirculating water. The conduit 30, shown in FIGS. 1–3 is preferably made of a light weight, durable material such as plastic, aluminum and the like which is also substantially resistant to UV light and pool chemicals. The conduit 30 is preferably about 50 to about 60 inches long, about 1 to about 2 inches high and about 3 to about 5 inches wide. In order to prevent the water distribution device 14 from sinking, foam blocks may be attached to the ends of the conduit 30 or inserted in the conduit 30 to provide sufficient buoyancy.

Figure 7:
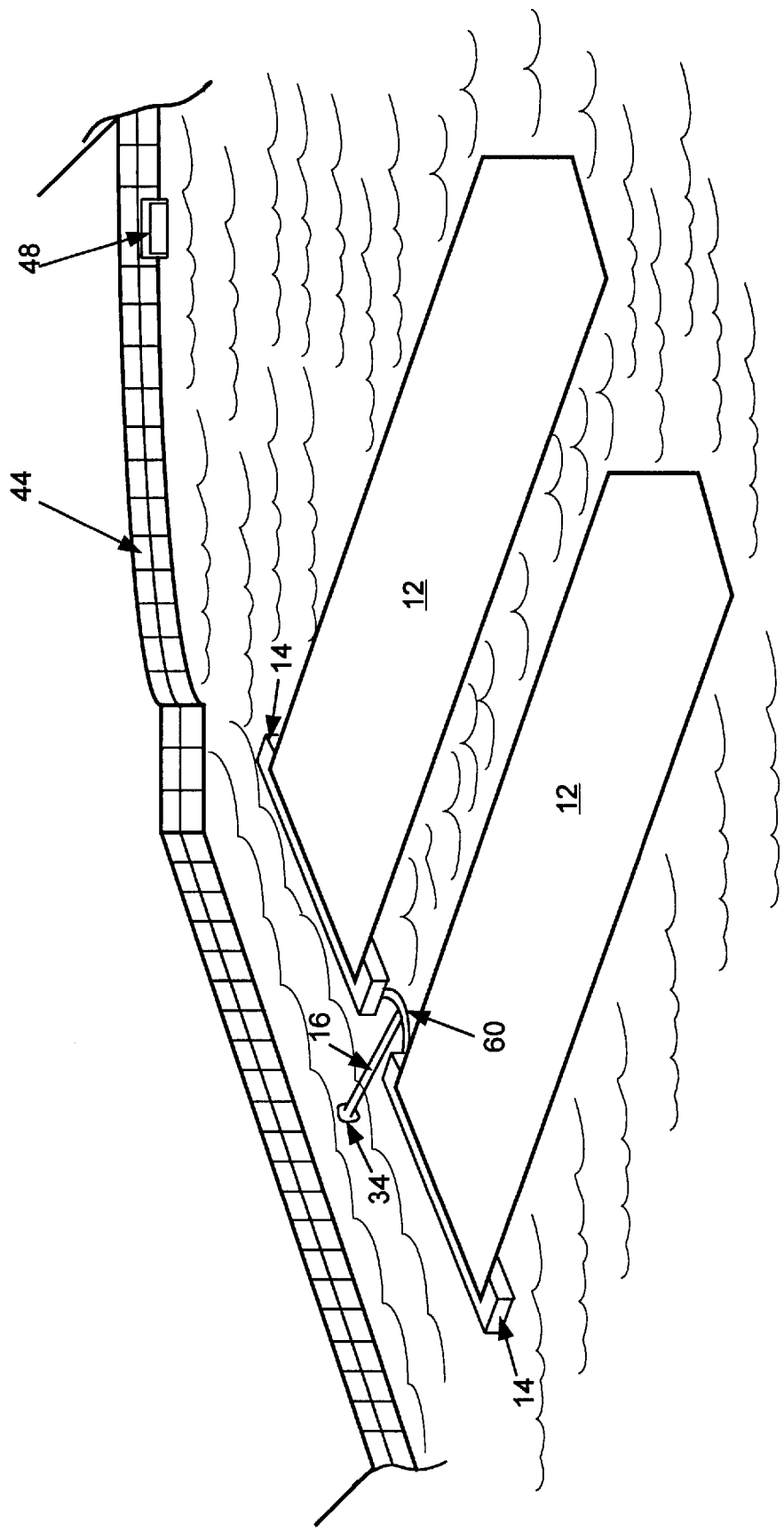
FIG. 7 is a perspective view of a swimming pool and pool water heating apparatus according to the invention.

The flexible conduit 16 connected to the water distribution device 14 may be any suitable hose or tubing which can be attached to the distribution device 14 by means of a fitting 36 or any other means known to those skilled in the art. The flexible conduit 16 is thus connected on a first end 38 to the fitting 36 and on a second end 40 to an inlet water jet 34 (FIG. 4). As shown in FIG. 4, water is circulated through a filter 42 for a pool 44 by flow through one or more pool drains 46 and skimmers 48 (FIG. 7) to an underground conduit 50 which is connected to the suction of a pump 52. The pump 52 pumps the water through the pool filter 42 and through an inlet conduit 54 to the inlet water jets 34. The water is then directed by flexible conduit 16 through the water distribution device 14 for flow longitudinally along the first surface 28 of the web 12. The water flowing along the first surface 28 of the web 12 is heated by sunlight 56 which heats the web 12 by exposure of a second surface 58 of the web thereto.

Figure 6:
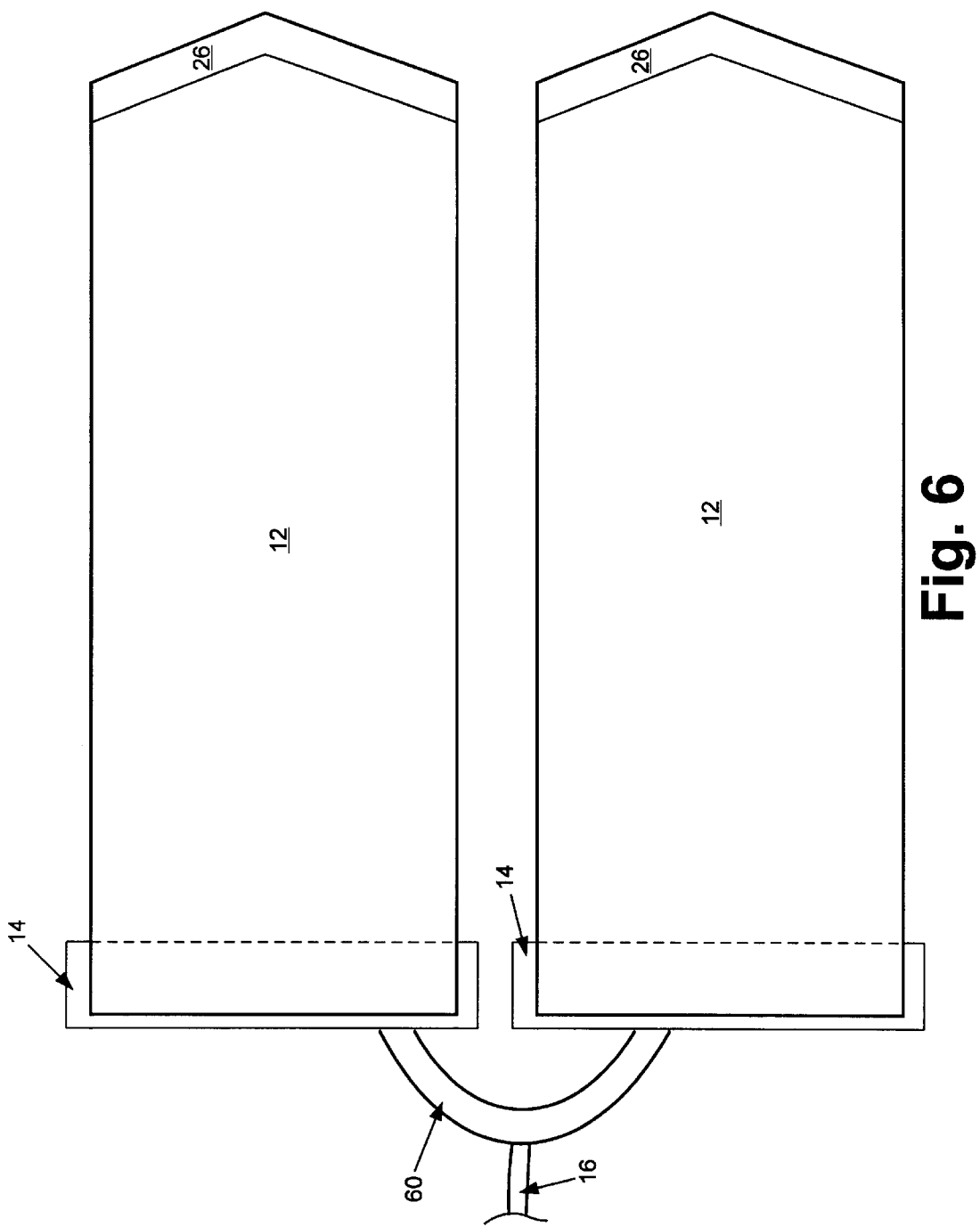
FIG. 6 is a plan view, not to scale of multiple connected pool water heating apparatus according to the invention.

As set forth above, the pool heating apparatus 10 may include a single web 12 and water distribution device 14 or may include multiple webs 12 and water distribution devices 14 as shown in FIGS. 5 and 6. When the apparatus includes multiple webs 12, water is preferably supplied to two or more of the water distribution devices 14 for the webs 12 by a common flexible conduit 60 (FIGS. 6 and 7) which is connected to both water distribution devices 14. The flexible conduit 16 provides flow of water from the inlet jets 34 to the common conduit 60.

An alternative design of a water distribution device which may be attached to web 12 is shown in FIGS. 8–10. Instead of an elongate rectangular conduit 30, as described above, the water distribution device may be a fan-jet nozzle device 62 as shown. The fan-jet nozzle 62 includes a fitting connection 64 on a first end 66 thereof for connection to the flexible conduit 16. Water flows into the nozzle 62 through a throat region 68 into a substantially triangular-shaped nozzle region 70. The nozzle region 70 terminates at a distal end 72 which contains a slit 74 or multiple slits or holes for flow of water therethrough.

In FIG. 10, the fan-jet nozzle 62 is attached to the first surface 28 of the flexible elongate web 12. When a fan-jet nozzle 62 is used to provide water flow adjacent the first surface 28 of the web 12, it is preferred to include ribs 76 or channels which are formed on the first surface 28 of the web in a radiating or starburst pattern. The ribs 76 preferably channel the water discharged from the fan-jet nozzle 62 across the width W of the first surface 28 of the web 12. For a web 12 having a length L of about 15 feet and a width W of about 8 feet, the fan-jet nozzle 62 is attached to about the center of the web 12 toward the first end 22 thereof. The ribs 76 radiate from the aperture 74 of the fan-jet nozzle 62 for a distance of about 3 feet along the first surface of the web 28. The ribs 76 preferably extend below the first surface 28 of the web 12 about 0.5 to about 1.5 inches and are preferably spaced apart no closer than about two inches. In the alternative, the web 12 may be a molded web have radiating or starburst channels molded therein to provide channeling of water adjacent the first surface 28 of the web in the same manner the ribs 76 provide channeling.

Figure 11:
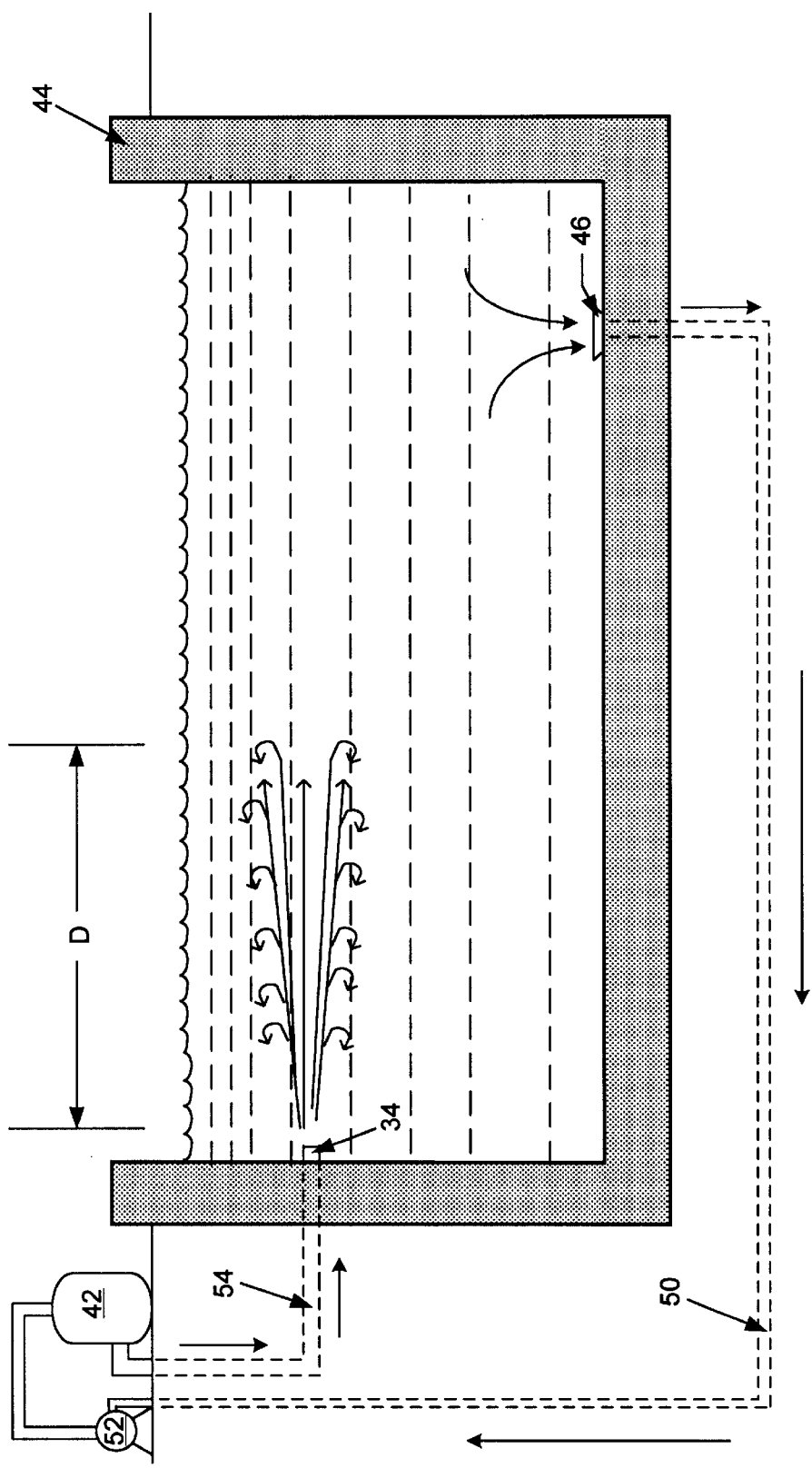
FIG. 11 is a schematic representation of a conventional swimming pool system.

The advantages of the invention will now be illustrated with reference to heating a residential swimming pool. A typical residential swimming pool 44 is about 20 feet wide and about 40 feet long and holds about 30,000 gallons of water. The circulation rate of water in the pool 44 typically ranges from about 25 to about 50 gallons per minute. Two, three or more inlet water jets 34 provided on a pool of this size and the pool contains 1 to 2 skimmers 48 and at least one bottom drain 46. The inlet water jets 34 are typically positioned opposite the skimmers 48 to provide a surface flow pattern that transports any floating debris such as leaves quickly to the skimmers for capture and removal. The bottom drain 46 induces vertical movement of pool water and prevents thermal stratification of pool water. Without the apparatus of the invention, the water flow from the inlet water jets 34 loses its velocity rapidly because of the formation of eddy currents and back mixing (FIG. 11). Hence, the velocity of water from the jets 34 is dissipated in a relatively short distance D.

In contrast to the free jet situation described above, the apparatus 10 of the invention induces water flow at a high velocity for substantially the entire length L of the web 12. While not desiring to be bound by theory, the movement of water adjacent the first surface 28 of the web 12 is believed to be due to a physical phenomenon known as the "Coanda Effect". The Coanda effect refers to the fact that a fluid (liquid or gas) introduced parallel to and near a relatively smooth surface will preferentially flow near to and along that surface. Hence, the fluid will maintain its velocity over a greater distance than if the fluid were flowing as a free jet. Because the recirculated pool water flows closely adjacent the first surface 28 of the web for substantially the entire length L of the web, the recirculated pool water provides a high temperature differential between the first surface 28 of the web and the upper surface of the pool water thereby providing high heat transfer between the sunlight heated web and the pool water.

Figure 12:
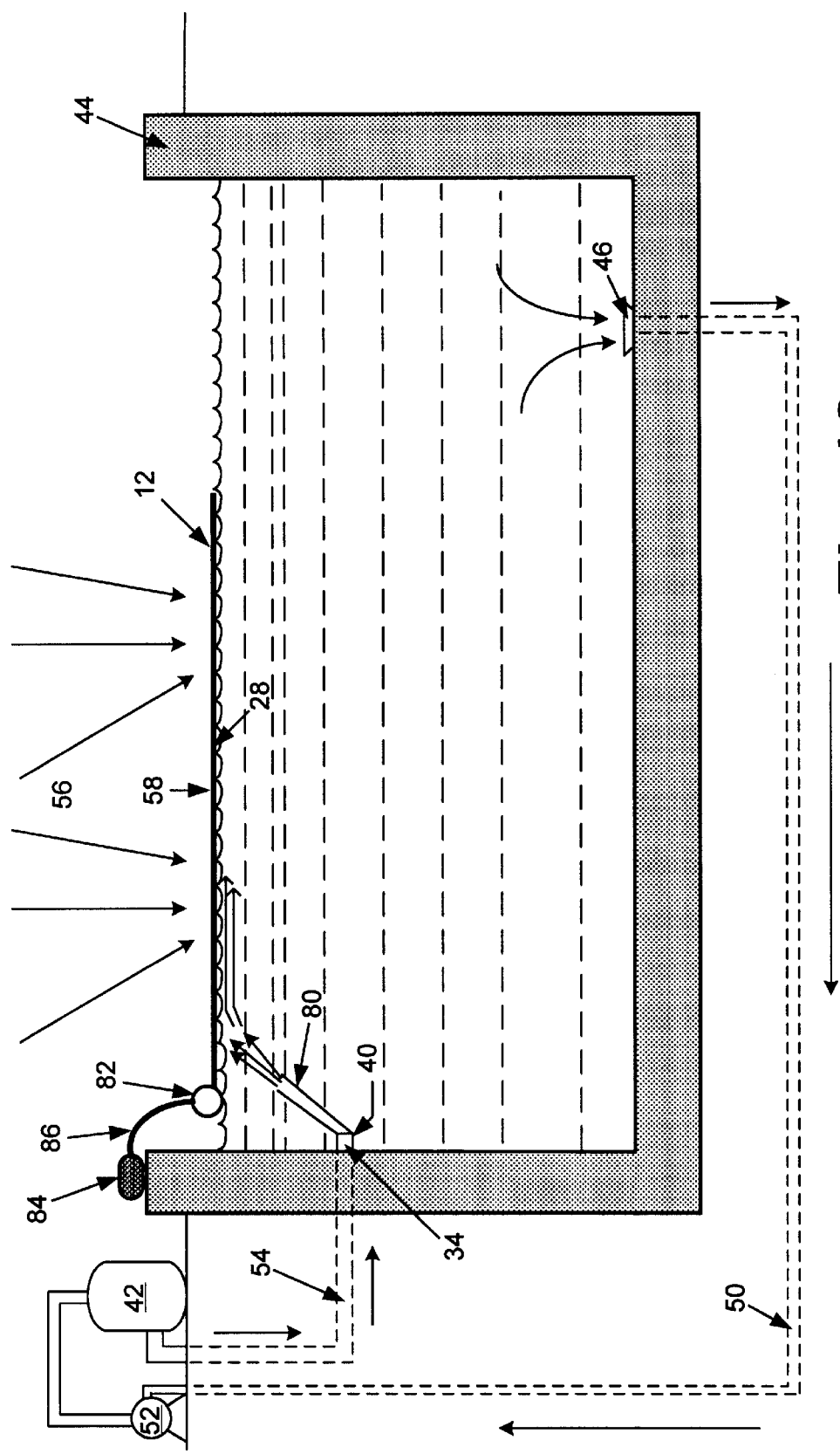
FIG. 12 is a schematic representation of a swimming pool system and pool water heating apparatus according to another embodiment of the invention.

Another embodiment of the invention is illustrated in FIG. 12. In this embodiment, a stream of water is directed by a pool inlet jet 80 to the first surface 28 of the web 12 without using a flexible conduit or hose directly connected to a water distribution device 14 as shown in FIG. 4 or to a fan jet nozzle as shown in FIG. 10. One end of the web 12 is preferably attached to a flotation device 82, selected from foam materials and flotation aids such as closed hollow cylinders or pipes attached to the web which in turn is secured to one end of the pool by a weight 84 and connecting rope 86. In all other respects, this embodiment of the invention provides the advantages described above by causing water flow from the inlet pool jets 80 to flow along first surface 28 of the web 12 thereby heating the water by intimate contact with the solar heated web.

To demonstrate the heating potential of the apparatus 10 of the invention, assume a swimming pool 20 feet wide and 40 feet long contains 30,000 gallons of water. An apparatus 10 of the invention having a web length L of 12 feet and a web width W of 10 feet provides 120 square feet of heating area. Assuming the apparatus 10 has a sunlight collection efficiency of 85% and the available solar heating capacity is 3000 BTU/ft$^2$ per day, the heat transferred to the pool water is given by the following equation:

$$3000 \text{ BTU/ft}^2 \text{ per day} \times 0.85 \times 120 \text{ ft}^2 = 306,000 \text{ BTU/day}.$$

Since the heat capacity of water is about 1 BTU/lb-° F., the temperature rise of the pool water is found by the following:

$$\text{Temperature rise } (\Delta T) = 1 \text{ lb-° F./BTU} \times 306,000 \text{ BTU/day}/250,200 \text{ lbs} = 1.22° \text{ F./day}.$$

Hence, the invention provides effective pool water heating with a relatively light weight, easily manufactured apparatus 10.

The foregoing embodiments of this invention have been presented for purposes of illustration and description. They are not intended to be exhaustive or to limit the invention to the precise form disclosed. Obvious modifications or variations are possible in light of the above teachings. The embodiments are chosen and described in an effort to provide illustrations of the principles of the invention and its practical application, and to thereby enable one of ordinary skill in the art to utilize the invention in various embodiments and with various modifications as is suited to the particular use contemplated. All such modifications and variations are within the scope of the invention as determined by the appended claims when interpreted in accordance with the breadth to which they are fairly, legally, and equitably entitled.

What is claimed is:

1. An outdoor swimming pool heating apparatus, comprising:
    a substantially buoyant elongate web having a first end, a second end, a first exterior surface and a second exterior surface, the second exterior surface being positionable to face away from a water surface of the swimming pool and the first exterior surface being positionable adjacent and facing the water surface;
    a water distributor attached to the first end of the web adjacent the first exterior surface of the web for flowing pool water longitudinally adjacent the first exterior surface of the web substantially parallel to the first exterior surface of the web for substantially the entire length of the web; and
    a conduit in flow communication with the distributor for providing a high velocity flow of water from a swimming pool pump to the water distributor to induce a Coanda Effect of flowing water relative to the web to heat the water in the pool during sunlight hours.

2. The pool heating apparatus of claim 1 wherein the web is substantially opaque and comprises a dark colored material having a color sufficient to provide pool water heating when exposed to the sun.

3. The pool heating apparatus of claim 2 wherein the web is comprised of a black colored web.

4. The pool heating apparatus of claim 2 wherein the web is comprised of a dark blue colored web.

5. The pool heating apparatus of claim 1 wherein the web is comprised of a material having a specific gravity of less than 1.0.

6. The pool heating apparatus of claim 1 wherein the web comprises floatation devices selected from air pockets, foam materials and flotation aids attached to the web.

7. The pool heating appartus of claim 1 wherein the water distributor device comprises a fan-type discharge nozzle.

8. The pool heating apparatus of claim 7 wherein the first exterior surface of the web contains substantially longitudinal space-apart ribs for channelling water from the fan-type discharge nozzle adjacent the first exterior surface of the web.

9. The pool heating apparatus of claim 1 wherein the first exterior surface of the web contains substantially longitudinal space-apart ribs for channelling water from the water distribution device adjacent the first exterior surface of the web.

10. The pool heating apparatus of claim 1 wherein the water distributor comprises a substantially closed elongate conduit containing apertures disposed along a length thereof for flow of pool water adjacent the first surface of the web.

11. The pool heating apparatus of claim 1 wherein the web comprises a material having a specific gravity of less than 1.0.

12. A method for heating a swimming pool, comprising:
    providing a swimming pool heating apparatus including,
        a substantially flexible elongate web having a first end, a second end, a first surface and a second surface;
        a water distribution device attached to a first end of the flexible elongate web adjacent the first surface of the web for flowing pool water longitudinally adjacent the first surface of the web at a high velocity substantially parallel to the web for substantially the entire length of the web; and a flexible tubular conduit connected to the water distribution device for providing water from a swimming pool pump to the water distribution conduit, wherein the web is configured to float on pool water and the web does not contain water flow conduits therein for flow of water from the water distribution device along the first or second surface of the web;

floating the web on a surface of the swimming pool water;

attaching the flexible tubular conduit to a swimming pool jet for flow of water from the swimming pool pump to the water distribution device for water flow along the first surface of the web; and flowing water along the first surface of the web at a velocity sufficient to induce a Coanda Effect of flowing water adjacent the first surface of web while exposing the web to sunlight thereby heating the water adjacent the first surface of the web.

13. The method of claim 12 wherein the web is provided as a substantially opaque dark colored material having a color sufficient to provide pool water heating when exposed to the sun.

14. The method of claim 12 wherein the web is comprised of a material having a specific gravity of less than 1.0.

15. The method of claim 12 further comprising providing floatation devices and attaching the flotation devices to the web.

16. The method of claim 12 wherein the water distribution device comprises a fan-type discharge nozzle and the first surface of the web contains substantially longitudinal space-apart ribs, further comprising flowing water from the pool jet along the first surface of the web substantially parallel to the ribs.

17. The method of claim 12 wherein the water distribution device comprises a substantially closed elongate conduit containing apertures disposed along a length thereof for flow of pool water adjacent the first surface of the web.

18. An outdoor swimming pool heating apparatus, comprising:

a substantially buoyant web having a first end, a second end, a first exterior surface and a second exterior surface, the second exterior surface being positionable to face away from a water surface of the swimming pool and the first exterior surface being positionable adjacent and facing the water surface; and a pool water inlet jet directed to the first end of the web adjacent the first exterior surface of the web for flowing pool water longitudinally adjacent the first exterior surface of the web, wherein the web is substantially opaque and comprises a dark colored material having a color sufficient to provide pool water healing when exposed to the sun and wherein the first exterior surface of the web contains substantially longitudinal space-apart ribs for channelling water from the inlet water jet adjacent the first exterior surface of the web.

19. The pool heating apparatus of claim 18 wherein the web comprises a material having a specific gravity of less than 1.0.

20. The pool heating apparatus of claim 18 wherein the web further comprises floatation devices selected from air pockets, foam materials and floatation aids attached to the web.

* * * * *